United States Patent [19]
Thompson

[11] Patent Number: 5,906,335
[45] Date of Patent: May 25, 1999

[54] FLIGHT DIRECTION CONTROL SYSTEM FOR BLIMPS

[76] Inventor: Mark N. Thompson, 564 B 2400 N, Dewey, Ill. 61840

[21] Appl. No.: 08/838,609

[22] Filed: Apr. 10, 1997

Related U.S. Application Data

[63] Continuation of application No. 08/448,634, May 23, 1995.
[51] Int. Cl.[6] ...................................................... B69B 1/02
[52] U.S. Cl. ................................ 244/96; 244/92; 244/51; 244/24; 446/225; 446/426
[58] Field of Search .............................. 244/96, 92, 53 B, 244/51, 24, 25, 26, 27, 28, 29, 30; 446/225, 426

[56] References Cited

U.S. PATENT DOCUMENTS

| | | |
|---|---|---|
| 987,624 | 3/1911 | Hansen ....................................... 244/51 |
| 1,291,687 | 1/1919 | Reynolds et al. . |
| 1,385,972 | 7/1921 | Upson . |
| 1,575,802 | 3/1926 | Valkenberg ................. 244/96 |
| 1,657,955 | 1/1928 | Bylek . |
| 1,718,349 | 6/1929 | Gordon . |
| 1,726,062 | 8/1929 | Gilman . |
| 1,842,125 | 1/1932 | Schwarz . |
| 1,869,256 | 7/1932 | Hines . |
| 2,081,381 | 5/1937 | Oehmichen . |
| 2,131,155 | 9/1938 | Waller . |
| 2,192,300 | 3/1940 | Droitcour . |
| 2,668,026 | 2/1954 | Price . |
| 2,885,206 | 5/1959 | Ensley . |
| 3,292,304 | 12/1966 | Wolfe . |
| 3,957,228 | 5/1976 | Kenney, Jr. . |
| 3,957,230 | 5/1976 | Boucher et al. . |
| 4,085,912 | 4/1978 | Slater . |
| 4,204,656 | 5/1980 | Seward . |
| 4,366,936 | 1/1983 | Ferguson . |
| 4,408,412 | 10/1983 | Forker . |
| 4,573,937 | 3/1986 | Stanzel . |
| 4,695,012 | 9/1987 | Lindenbaum . |
| 4,729,750 | 3/1988 | Prusman . |
| 4,799,914 | 1/1989 | Hutchinson . |
| 4,891,029 | 1/1990 | Hutchinson . |

Primary Examiner—Charles T. Jordan
Assistant Examiner—Tien Dinh
Attorney, Agent, or Firm—Brinks Hofer Gilson Lione

[57] ABSTRACT

A method and apparatus for controlling the flight direction of a blimp. The blimp includes an elongate fuselage for containing a lighter-than-air gas, a movable rudder located toward a tail end of the fuselage, and at least one propeller mounted on a side of the fuselage. The propeller is attached to the blimp by a connection that provides two axes of movement. The propeller connection can be rotated or pivoted (1) about a first axis which is a horizontal axis that is perpendicular to a direction of the longitudinal axis of the elongate fuselage, and/or (2) about a second axis which is a vertical axis that is perpendicular to the direction of the longitudinal axis of the fuselage.

20 Claims, 4 Drawing Sheets

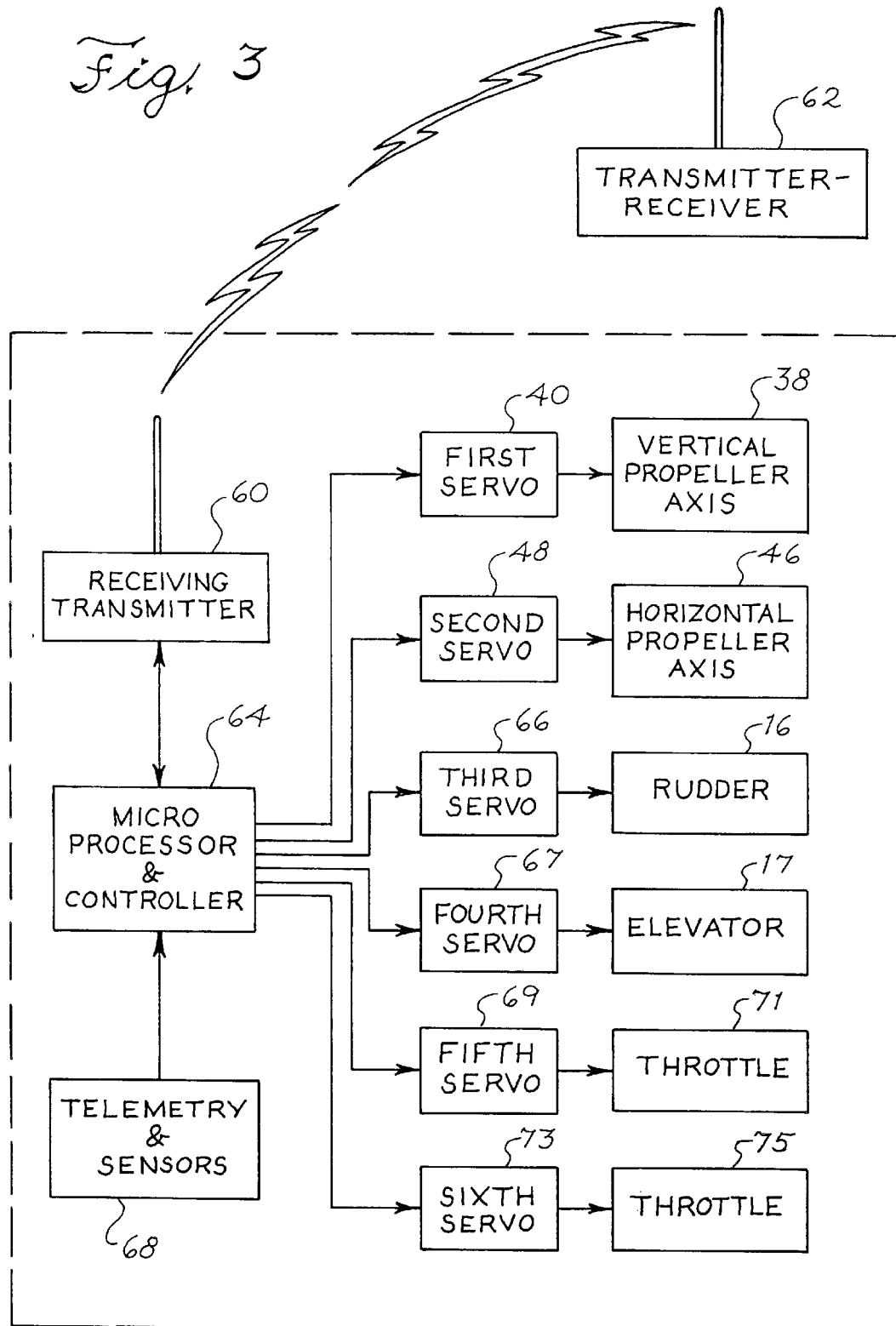

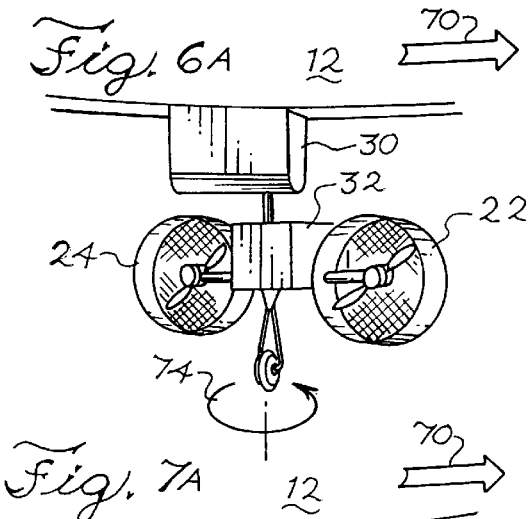
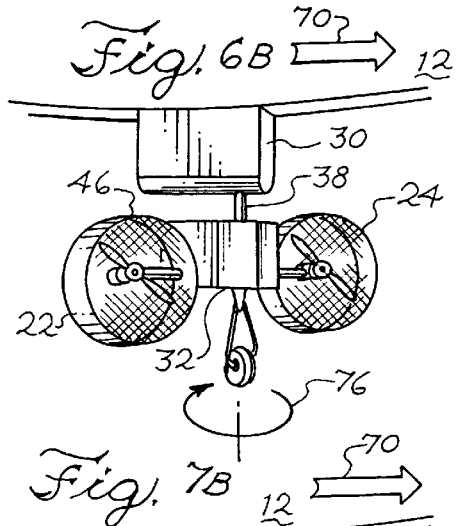
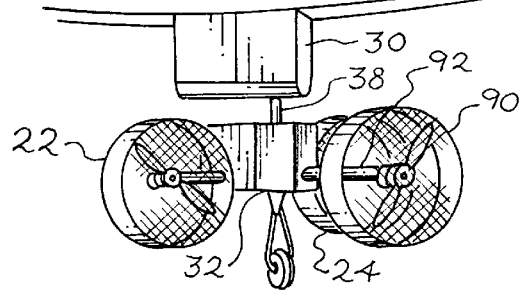
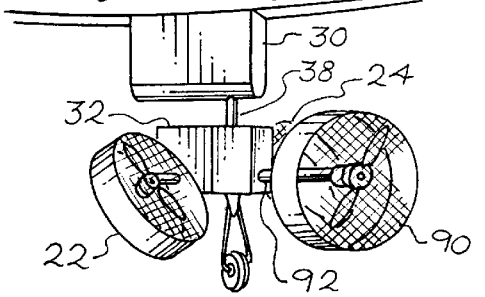
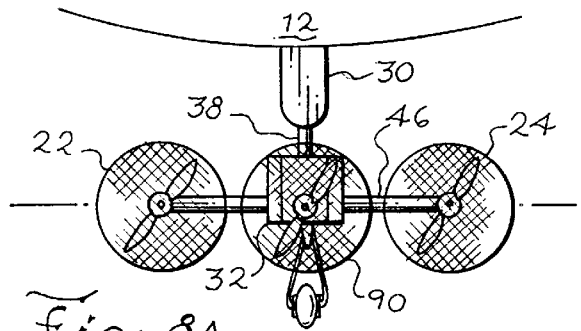
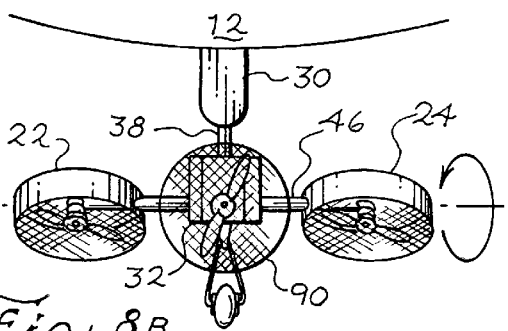
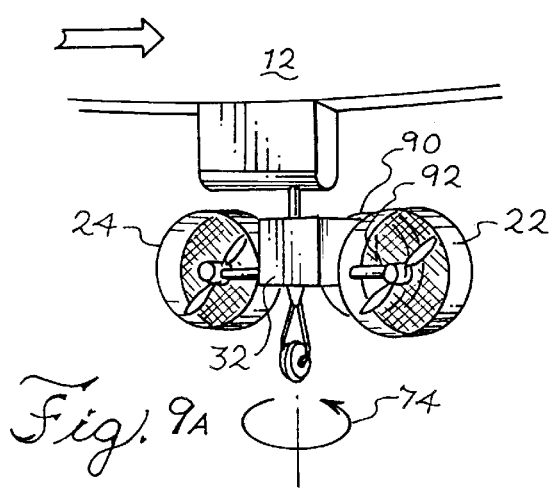
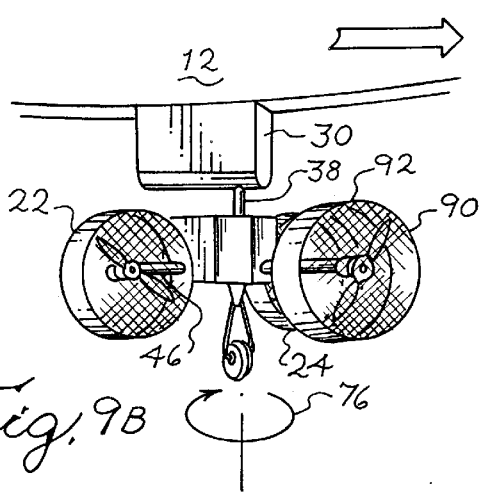

FLIGHT DIRECTION CONTROL SYSTEM FOR BLIMPS

This application is a continuation of application Ser. No. 08/448,634, filed May 23, 1995.

BACKGROUND OF THE INVENTION

The present application relates to blimps and more particularly to an improved system for controlling the flight direction of a blimp.

Blimps continue to be used in the present day. In addition to continuing to be a mode of transportation, blimps nowadays serve an important use for advertising purposes. Advertising messages are displayed on the sides of airborne blimps that fly over locations or events where large crowds of people gather, for example, at stadiums, beaches, etc. Blimps may be manned, i.e. include a pilot and/or passengers or un-manned. Unmanned blimps are operated remotely from the ground by radio-control. Radio-controlled blimps can be made smaller since they do not have to carry human passengers.

Blimps generally use one or more motor driven propellers for propulsion. A conventional method for controlling the flight direction of a blimp is to provide a movable rudder located on a bottom side of the blimp fuselage near the tail end of the blimp. It is also conventional to provide that the propellers can be pivoted vertically, i.e. about a horizontal axis, to assist in climbing and descent. Other methods for controlling flight direction of blimps have been disclosed. For example, in U.S. Pat. No. 4,204,656, a miniblimp has a propeller connected to one motor that can turn it left or right and another motor to tilt the propeller up or down. The miniblimp has a fixed rudder, however, and positions the propeller at either the front or rear of the miniblimp.

There continues to be a need for a flight direction control system for lighter-than-air aircraft, such as blimps, that provides improved control and responsiveness under a variety of climatological conditions.

SUMMARY OF THE INVENTION

To achieve the foregoing and other objectives and in accordance with the purposes of the present invention, there is provided an improved method and apparatus for controlling the flight direction of a blimp. According to a first aspect of the present invention, the blimp includes an elongate fuselage for containing a lighter-than-air gas, a movable rudder located toward a tail end of the fuselage, and at least one propeller mounted on a side of the fuselage. The propeller is mounted so that it has two axes of movement. The propeller can be rotated or pivoted (1) about a first axis which is a horizontal axis that is perpendicular to a direction of the longitudinal axis of the elongate fuselage, and/or (2) about a second axis which is a vertical axis that is perpendicular to the direction of the longitudinal axis of the fuselage. The advantages of the present invention apply to manned and unmanned blimps.

According to a second aspect of the present invention, the blimp includes an elongate fuselage for containing a lighter-than-air gas, a rudder located toward a tail end of the fuselage, and at least two propellers mounted on a side of the fuselage. The propellers are mounted so that they have two axes of movement. The propellers can be rotated or pivoted (1) about a first axis which is a horizontal axis that is perpendicular to a direction of the longitudinal axis of the elongate fuselage, and/or (2) about a second axis which is a vertical axis that is perpendicular to the direction of the longitudinal axis of the fuselage.

According to a third aspect of the present invention, the blimp includes an elongate fuselage for containing a lighter-than-air gas, a rudder located toward a tail end of the fuselage, and at least three propellers mounted on the fuselage. The propellers are mounted so that at least one propeller, but fewer than all of the propellers, can be rotated or pivoted about a first axis which is a horizontal axis that is perpendicular to a direction of the longitudinal axis of the elongate fuselage. In addition, at least one of the propellers is mounted so that it can be rotated about a second axis which is a vertical axis that is perpendicular to the direction of the longitudinal axis of the fuselage.

BRIEF DESCRIPTION OF THE DRAWINGS

FIG. 3 is a schematic block diagram of a control system for the embodiment shown in FIG. 1.

FIG. 6A is a side view similar to FIG. 4A showing the propellers in the embodiment of FIG. 4A oriented about a vertical axis to port relative to the direction shown in FIG. 4A.

FIG. 6B is a side view similar to FIG. 6A showing the propellers in the embodiment of FIG. 4A oriented about the vertical axis toward starboard relative to the direction shown in FIG. 4A.

FIG. 7A is a side view similar to FIG. 4A showing a second embodiment of the present invention.

FIG. 7B is a side view of the embodiment of FIG. 7A showing one of the propellers oriented about a horizontal axis.

FIG. 8A is a front view of the embodiment shown in FIG. 7A.

FIG. 8B is a front view of the embodiment shown in FIG. 7B.

FIG. 9A is a side view of the embodiment of FIG. 7A showing the propellers oriented about a vertical axis toward port relative to the direction shown in FIG. 7A.

FIG. 9B is a side view of the embodiment of FIG. 7A showing the propellers oriented about a vertical axis toward starboard relative to the direction shown in FIG. 7A.

DETAILED DESCRIPTION OF THE PREFERRED EMBODIMENTS

Figure 1:
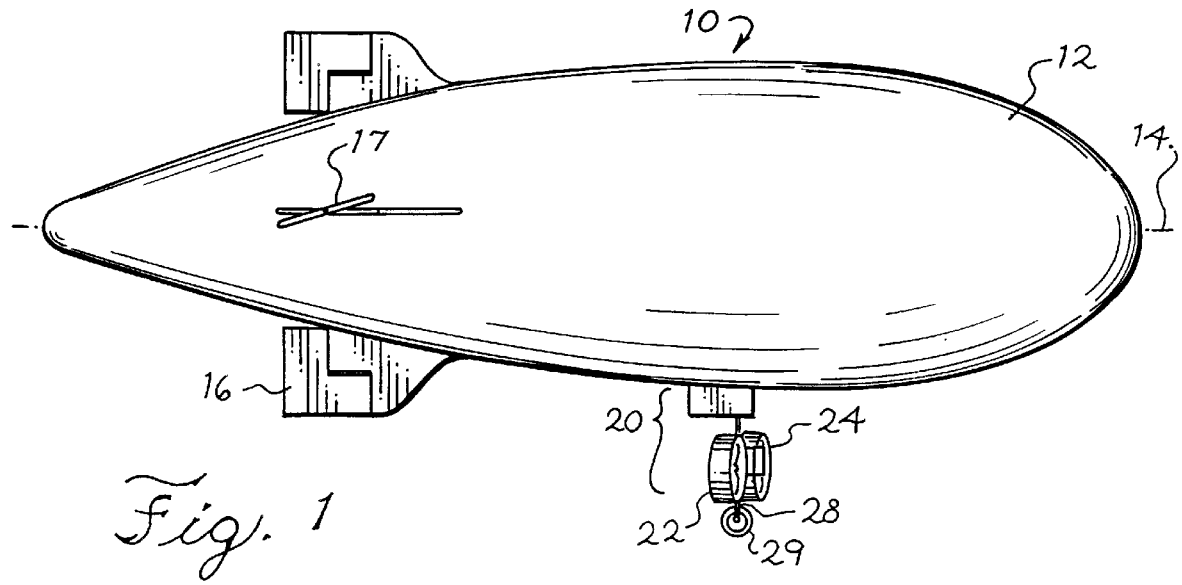
FIG. 1 is a side view of a blimp with an improved flight direction control system according to a first embodiment of the present invention.

FIG. 1 shows a first embodiment of the present invention. According to the first embodiment, there is provided a blimp 10 having a fuselage 12 with a horizontal longitudinal axis 14. The blimp 10 has a movable rudder 16 and an elevator 17 located at a tail end of the fuselage. A gondola 20 is located along the bottom side of the fuselage 12 approximately midway along the length of the blimp 10 between a front end of the fuselage and the tail end.

Figure 2:
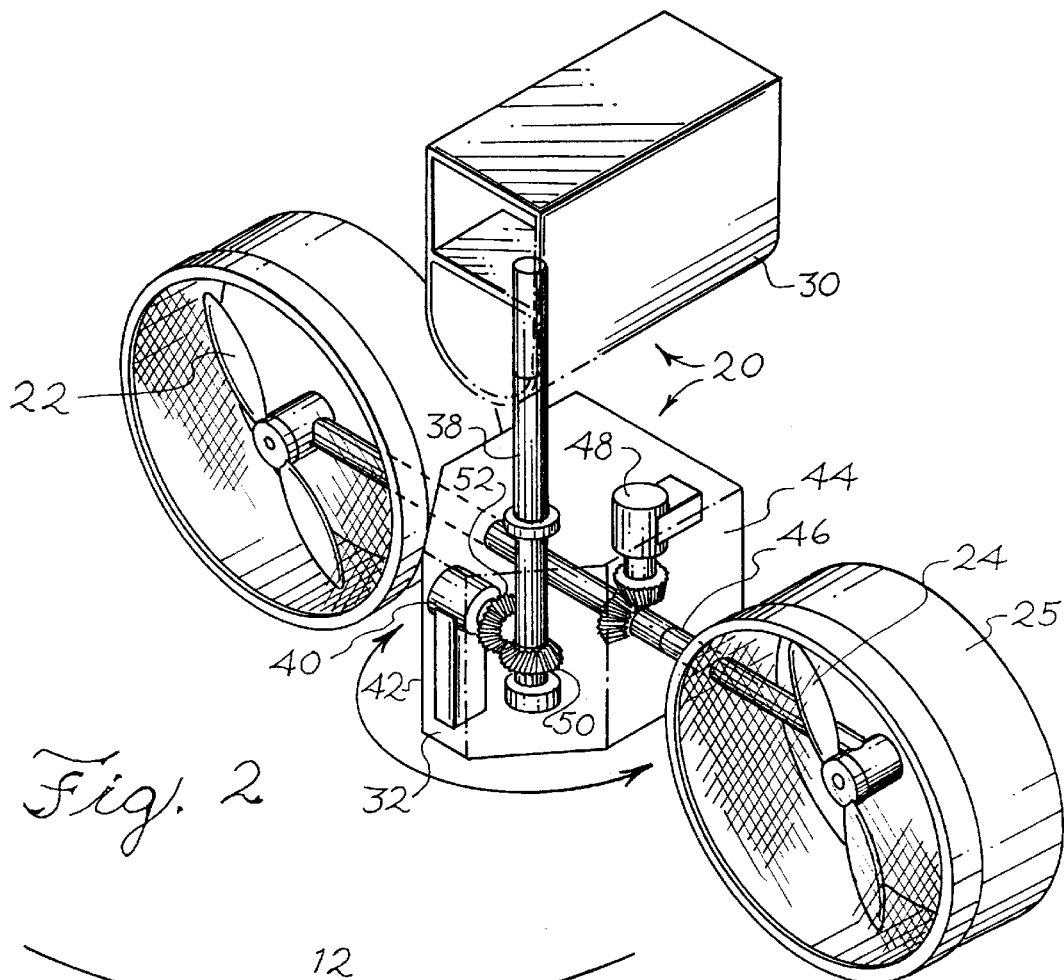
FIG. 2 is a front perspective view of a portion of the embodiment of FIG. 1 showing the propellers and housing (partially in cutaway).

Referring to FIG. 2 in conjunction with FIG. 1, connected to the gondola 20 are two propellers 22 and 24.

As shown in FIG. 2, these propellers are located in a side-by-side relationship. A reason for having two propellers is that in case one fails, the other can continue to operate the blimp. The propellers 22 and 24 are attached to the fuselage 10 by a connection that permits multiple axes of movement. The blimp may also include cowls around the propellers, such as cowl 25. Located at the bottom of the gondola 20 are a strut 28 and wheel 29.

The gondola 20 is formed of two parts: an upper housing portion 30 and a lower housing portion 32. The upper housing portion 30 is connected to the lower side of the fuselage 12. The connection between the upper housing portion 30 and the fuselage 12 is fixed, i.e. the connection provides for no relative movement between the upper housing portion 30 and the fuselage 12. The lower housing portion 32 is rotatably connected to the upper housing portion 30 by means of a first shaft 38. The first shaft 38 is connected to a first servo motor 40. The first servo motor 40 may be located in either the upper or lower housing portion. By means of the first shaft 38 and the first servo motor 40, the lower housing portion 32 can be rotated or pivoted about a vertical axis defined by the first shaft 38 relative to the upper housing portion 30.

The propellers 22 and 24 are connected to and extend from the sides 42 and 44 of the lower housing portion 32. Specifically, the propellers 22 and 24 connect to a second shaft 46 that extends through the lower housing portion 32. The second shaft 46 is connected to a second servo motor 48 located in the lower housing portion 32. By means of the second shaft 46 and the second servo motor 48, the propellers 22 and 24 can be rotated or pivoted about a horizontal axis defined by the second shaft 46.

In one embodiment, the servo motors 40 and 48 connect to the shafts by means of gears, such as gears 50 and 52 shown in FIG. 2. Alternatively, other means of connection may be used, such as chains and sprockets, rack and pinion, rope and spools, etc.

In the first preferred embodiment, the blimp 10 is unmanned. Accordingly, the blimp is operated from the ground by radio control. Referring to FIG. 3, a receiver-transmitter 60 is located on the blimp 10. The receiver-transmitter 60 may be located in the gondola 20 or elsewhere on the blimp. A transmitter-receiver 62 is located remotely such as on the ground. In a preferred embodiment, the receiver-transmitter 60 communicates with an on-board microprocessor-controller 64 that in turn communicates with each of the other components on the blimp. Specifically, the controller 64 communicates with the first servo motor 40 which in turn is connected to the vertical shaft 38, the second servo motor 48 that is connected to the horizontal shaft 46, a third servo motor 66 that is connected to the rudder 16, a fourth servo motor 67 that is connected to the elevator 17, and fifth and sixth servo motors 69 and 73 that are connected to throttles 71 and 75 for the engines. The third servo motor 66 operates to pivot the rudder 16 about an axis which is preferably substantially vertical. The fourth servo motor 67 operates to pivot the elevator 17 about an axis which is preferably substantially horizontal. In a preferred embodiment, the blimp also includes a telemetry-navigation-sensor system 68. The telemetry-sensor system 68 obtains information about the blimp's position, orientation, altitude, direction, speed, settings of components, such as rudder position, elevator position, engine rpm, etc. The telemetry-navigation-sensor system 68 communicates this information to the controller 64.

Radio control of airborne craft is well known to those of skill in the art. The transmitter-receiver 62 transmits radio signals to, and receives radio signals from, the receiver-transmitter 60 on the blimp. After obtaining the received signals, the receiver 60 communicates the signals to the controller 64 for control of the blimp. The received signals operate the position of the rudder 16, the elevator 17, the orientation of the lower housing 32 relative to the upper housing 30, the orientation of the propellers about the horizontal axis defined by the second shaft 46, the engine speed, etc. The telemetry-navigation-sensor system 68 communicates information to the controller 64 which in turn may communicate the information to the transmitter-receiver 62 on the ground.

Figure 4A:
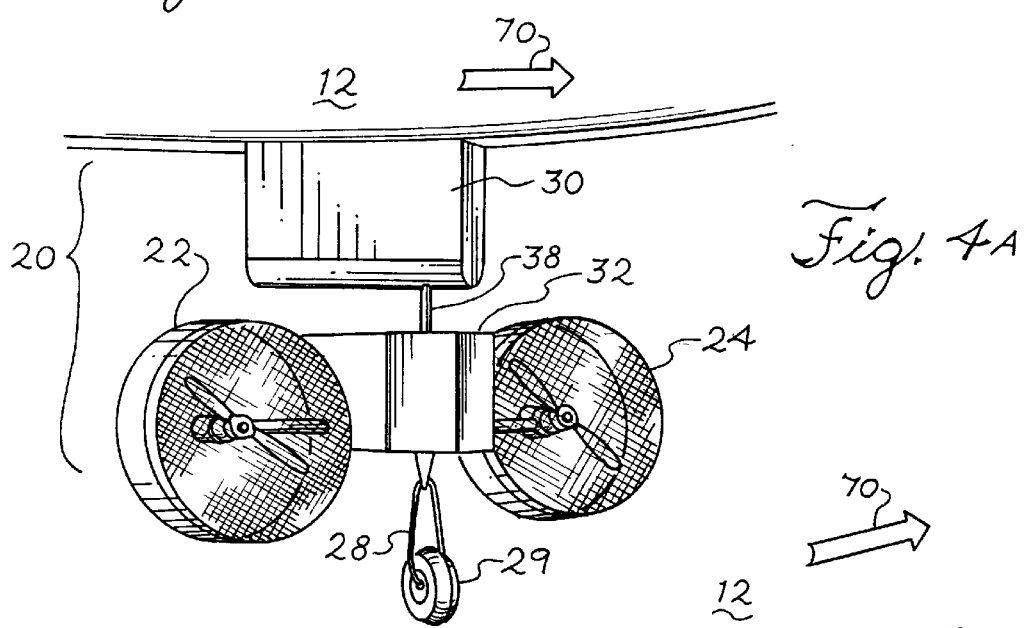
FIG. 4A is a side view of the housing and one of the propellers of the embodiment of the blimp in FIG. 1.
Figure 4B:
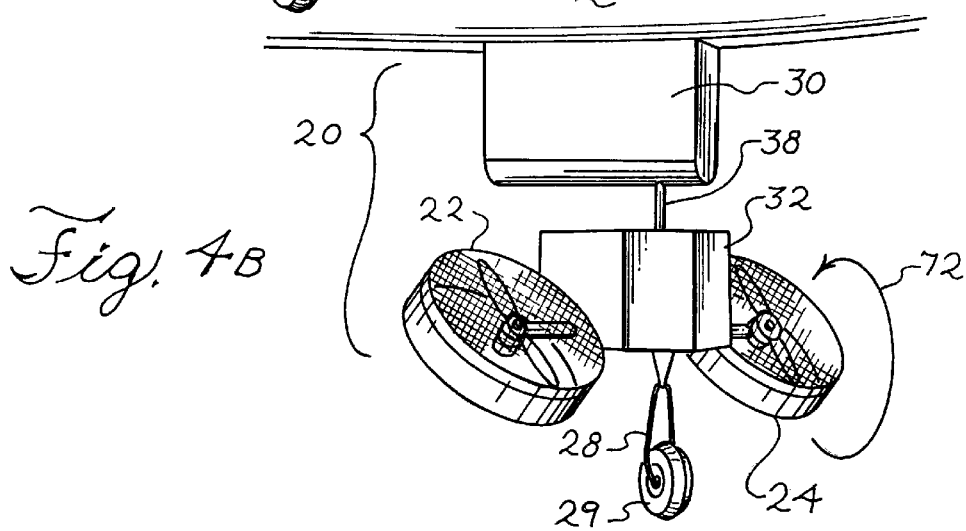
FIG. 4B is a view similar to FIG. 4A showing the propeller oriented about a horizontal axis.
Figure 5A:
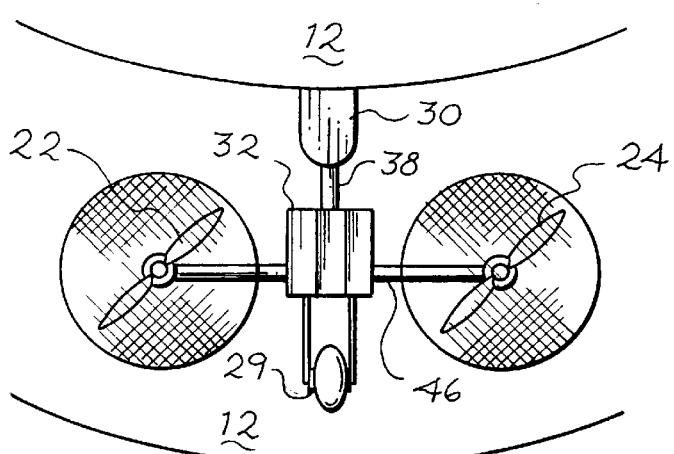
FIG. 5A is a front view of the housing and propellers shown in FIG. 4A.
Figure 5B:
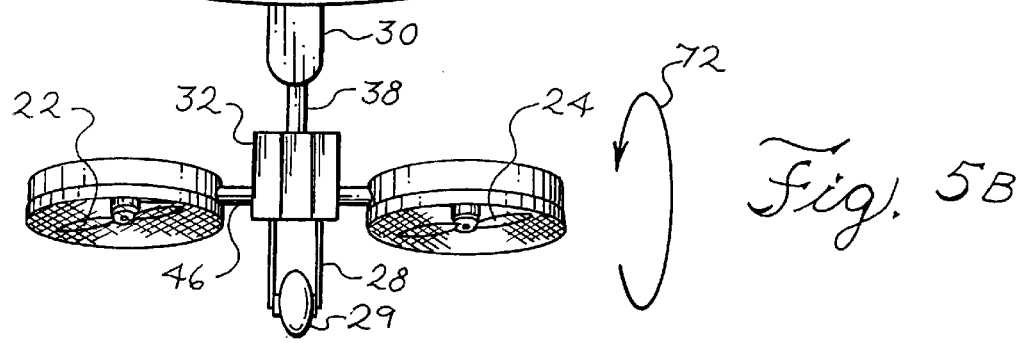
FIG. 5B is a front view of the housing and propellers as shown in FIG. 4B.

FIGS. 4A through 5B show an example of how the propellers can be oriented to provide for vertical control of the blimp. FIGS. 4A and 5A show the propellers 22 and 24 oriented directly horizontally. This orientation is suitable for steady cruising. With the propellers oriented in this direction, the blimp will be propelled in a direction indicated by the arrow 70. FIGS. 4B and 5B show the propellers 22 and 24 oriented upward. This orientation provides an upward thrust for climbing. The change in orientation of the propellers is effected by rotation of the second shaft 46 to which the propellers are connected in a direction indicated by the arrow 72. This will result in a change in the direction 70 in which the blimp is propelled. The propellers can also be oriented in an downward direction for descent. The elevator 17 at the tail of the blimp may also be used for changing altitude.

FIGS. 6A and 6B show an example how the propellers can be oriented for change of direction to the left or right. FIG. 6A shows the propellers oriented in a port direction and FIG. 6B shows the propellers oriented in a starboard direction. The change in orientation of the propellers is effected by rotation of the first shaft 38 to which the lower housing 32 is connected, as indicated by arrows 74 and 76. The left-right change in orientation of the propellers may be accompanied by a corresponding change in position of the rudder 16 or may be operated independently. The propellers can be operated for a left-right change of direction at the same time as for an up-down change of direction.

The first embodiment provides improved control of he flight direction of a blimp with the addition of another axis of movement to the pair of propellers in conjunction with operation of the rudder. The embodiment of the blimp described above can handle a side wind that would push a conventional blimp off course. To handle a side wind with the embodiment of the blimp described above, the propellers 22 and 24 can be rotated into the side wind and throttle can be applied thereby stopping drift. With the improved control provided by the additional axis of propeller movement, the blimp 10 can fly in much tighter locations with less concern of collision. These advantages are especially beneficial to unmanned blimps, but apply as well to manned blimps.

Referring to FIGS. 7A–9B, there is shown a second preferred embodiment of the present invention. Many of the components of this embodiment are similar or identical to those in the previous embodiment and accordingly like components are represented by the same numerals.

Referring to FIG. 7A, connected to and extending from the lower housing portion 32 is a third propeller 90.

The third propeller 90 is mounted on a third shaft 92 that extends from the front of the lower housing portion 32. The third propeller 90 is similar or identical to the first and second propellers 22 and 24. Unlike the first and second propellers 22 and 24, the third propeller 90 is not mounted on the second shaft 46. Accordingly, the vertical orientation of third propeller is independent of the vertical orientation of the first and second propellers. Although the third propeller can be provided with a means to effect a change in vertical orientation, e.g. by incorporation of an axis of rotation into the third shaft, in a preferred embodiment, the third propeller 90 has a fixed vertical orientation relative to the gondola 20. However, since the third propeller 90 is connected to the lower housing portion 32, it is rotated about the vertical-axis defined by second shaft 48 along with the first hand second propellers 22 and 24. In a preferred embodiment, the speed of the third propeller 90 is also independently controllable by means its own throttle which is separate from the throttles that operate the first and second propellers.

FIGS. 7A through 8B show an example of how the propellers can be oriented to provide for vertical control of the blimp according to the second embodiment. FIGS. 7A and 8A show the propellers 22, 24 and 90 oriented directly horizontally. This orientation is suitable for steady cruising. FIGS. 7B and 8B show the propellers 22 and 24 oriented upward, but the propeller 90 oriented directly horizontally. As in the previous embodiment, this orientation provides an upward thrust for climbing. In addition, the third propeller helps to prevent the blimp from pitching for improved control as compared to the previous embodiment. The propellers 22 and 24 can also be oriented in an downward direction for descent.

FIGS. 9A and 9B show an example of how the propellers 22, 24 and 90 can be oriented for change of direction to the left or right. FIG. 9A shows the propellers oriented in a port direction and FIG. 9B shows the propellers oriented in a starboard direction. The change in orientation of the propellers is effected in the same manner as in the previously described embodiment. As in the previous embodiment, the left-right change in orientation of the propellers is accompanied by a corresponding change in position of the rudder 16.

In one preferred embodiment, the unmanned blimp is 55 feet in length and has a diameter of 11 feet. The blimp 10 has a gross weight of 200 pounds (offset by the helium) and can carry a 60 pound payload. Each of the propellers is 20 inches long and each is driven by a 2 stroke 1.8 cubic inch liquid fuel-powered model airplane engine developing 15 horsepower and speeds of 40 miles per hour. An alcohol-based liquid fuel, such as used for model airplanes, would be suitable. Alternatively, other types of fuel may be used, including gasoline. The servo motors are electric motors and may be hobby quality or industrial or military quality grade motors. An on-board battery provides power for the servo motors. The on-board controller is a DART 32 computer microprocessor. The telemetry-navigation-sensor system uses GPS-satellite triangulation for exact location, a Fluxgate compass for determining heading, an altimeter, an anemometer, and a wind vane. The blimp also includes ballast controls, such as a water ballast release, a helium release, a ballenaide-air pump that inflates a balloon inside the blimp to keep the blimp bag firm after release of helium, and a pressure sensor to monitor the interior pressure of the blimp. These ballast controls may be operated by radio control. The receiver-transmitter 60 and transmitter-receiver 62 are ACE MicroPro 8000 units with the ground based unit integrated with a laptop computer. The specific equipment used for the various components of the blimp is exemplary and numerous other alternative types of equipment can be used. For example, the propellers could be driven by electric motors rather than liquid fuel engines. Also, the size of the blimp can vary depending on the need. Further, although a preferred embodiment of the blimp is unmanned, the present invention is intended to include manned blimps as well.

As mentioned above, the blimp may be used advantageously for advertising purposes. For this purpose, it may be equipped with lights, lasers, billboards, etc. It may also be equipped with a dropping mechanism for dropping leaflets. Further, the blimp may also be equipped with a camera. All these components may be controlled via the radio link from the ground.

It is intended that the foregoing detailed description be regarded as illustrative rather than limiting and that it is understood that the following claims including all equivalents are intended to define the scope of the invention.

I claim:

1. A blimp having improved maneuverability, said blimp comprising:
   an elongate fuselage for containing a lighter-than-air gas and defining a longitudinal axis;
   a rudder coupled to a tail end of said fuselage by means of a first connection, said first connection adapted to permit said rudder to be pivoted about a first vertical axis of said fuselage, said first vertical axis being orthogonal to said longitudinal axis;
   a first motor coupled to said rudder to cause pivoting of said rudder about said first vertical axis;
   a gondola mounted to said fuselage at a bottom central side thereof, said gondola having a portion connected to said fuselage in a turret-like manner by means of a second connection, said second connection adapted to permit said portion of said gondola to be pivoted about a second vertical axis which is parallel to said first vertical axis;
   at least one propeller mounted on said portion of said gondola by a third connection that permits said at least one propeller to be pivoted about a first horizontal axis, said first horizontal axis being orthogonal to both said longitudinal axis and said second vertical axis; and
   a second motor coupled to said at least one propeller to cause pivoting of said at least one propeller about at least one of said first horizontal axis and said second vertical axis;
   whereby said blimp has improved maneuverability.

2. The invention of claim 1 further comprising:
   a controller located on board said fuselage and having a first output coupled to said first motor and a second output coupled to said second motor to control the operations thereof.

3. The invention of claim 1 further comprising:
   a third motor coupled to said at least one propeller wherein said second motor is adapted to cause pivoting of said at least one propeller about one of said first horizontal axis and said second vertical axis and said third motor is adapted to cause pivoting of said at least one propeller about the other of said first horizontal axis and said second vertical axis.

4. The invention of claim 1 further comprising:
   an elevator coupled to said tail end of said fuselage by means of a third connection, said third connection adapted to permit said elevator to be pivoted about a second horizontal axis parallel to said first horizontal axis.

5. The invention of claim 1 further comprising:
   a second propeller coupled to said fuselage at a bottom central side thereof by means of said second connection,
   and wherein said second connection is further adapted to permit said second propeller to be pivoted about only said second vertical axis but not said first horizontal axis.

6. The invention of claim 5 wherein said second connection is further adapted to maintain said second propeller in a direction parallel to said longitudinal axis while said at least one propeller is pivoted about said first horizontal axis.

7. The invention of claim 1 further comprising:
a receiver located on said fuselage for receiving signals from a radio control transmitter and outputting a signal operative to said controller.

8. A blimp having improved maneuverability, said blimp comprising:
an elongate fuselage for containing a lighter-than-air gas and defining a longitudinal axis;
a rudder coupled to a tail end of said fuselage by means of a first connection that permits said rudder to be pivoted about a first vertical axis of said fuselage, said first vertical axis being orthogonal to said longitudinal axis;
a first motor coupled to said rudder to cause pivoting of said rudder about said first vertical axis;
a gondola mounted to said fuselage at a location approximately midway along the bottom side of said fuselage, said gondola having a portion connected to said fuselage in a turret-like manner;
at least one propeller coupled to said gondola by means of a second connection, said second connection adapted to permit said at least one propeller to be pivoted about two axes relative to the fuselage, said two axes including a second vertical axis which is parallel to said first vertical axis and a first horizontal axis, said first horizontal axis being orthogonal to both said longitudinal axis and said second vertical axis; and
a second motor coupled to said at least one propeller to cause pivoting of said at least one propeller about at least one of said first horizontal axis and said second vertical axis;
and a controller located on board said fuselage and having outputs coupled to said first and second motors to control pivoting of said rudder and said at least one propeller;
whereby said blimp has improved maneuverability.

9. The invention of claim 8 further comprising:
an elevator coupled to said tail end of said fuselage by means of a third connection, said third connection adapted to permit said elevator to be pivoted about a second horizontal axis parallel to said first horizontal axis.

10. The invention of claim 8 further comprising:
a third motor coupled to said at least one propeller wherein said second motor is adapted to cause pivoting of said at least one propeller about one of said first horizontal axis and said second vertical axis and said third motor is adapted to cause pivoting of said at least one propeller about the other of said first horizontal axis and said second vertical axis, said controller having an output to said third motor to control operation thereof.

11. The invention of claim 8 wherein said at least one propeller is located on a bottom side of said fuselage.

12. The invention of claim 8 further comprising:
a receiver located on said fuselage for receiving signals from a radio control transmitter and outputting a signal operative to said controller.

13. The invention of claim 8 further comprising:
a second propeller coupled to said fuselage at a bottom central side thereof by means of said second connection,
and wherein said second connection is further adapted to permit said second propeller to be pivoted about only said second vertical axis but not said first horizontal axis.

14. The invention of claim 13 wherein said second connection is further adapted to maintain said second propeller in a direction parallel to said longitudinal axis while said at least one propeller is pivoted about said first horizontal axis.

15. The invention of claim 8 further comprising:
an elevator coupled to said tail end of said fuselage by means of a third connection, said third connection adapted to permit said elevator to be pivoted about a second horizontal axis parallel to said first horizontal axis; and
an elevator motor coupled to said elevator to cause pivoting thereof about said second horizontal axis;
and wherein said controller provides an output to said elevator motor to control operation thereof.

16. A blimp having improved maneuverability, said blimp comprising:
an elongate fuselage for containing a lighter-than-air gas and defining a longitudinal axis;
a rudder coupled to a tail end of said fuselage by means of a first connection, said first connection adapted to permit said rudder to be pivoted about a first vertical axis of said fuselage, said first vertical axis being orthogonal to said longitudinal axis;
a first motor coupled to said rudder to cause pivoting of said rudder about said first vertical axis;
a gondola coupled to said fuselage at a bottom central side thereof;
at least two propellers located on a turret-like portion of said gondola by means of a second connection, said second connection adapted to permit said at least two propellers to be pivoted in unison about two axes, said two axes including a second vertical axis which is parallel to said first vertical axis and a first horizontal axis, said first horizontal axis being orthogonal to both said longitudinal axis and said second vertical axis; and
a second motor coupled to said at least one propeller to cause pivoting of said at least one propeller about at least one of said first horizontal axis and said second vertical axis;
whereby said blimp has improved maneuverability.

17. The invention of claim 16 further comprising:
a receiver located on said fuselage for receiving signals from a radio control transmitter and outputting a signal operative to said controller.

18. The invention of claim 16 further comprising:
a third motor coupled to said at least two propellers wherein said second motor is adapted to cause pivoting of one of said at least two propellers about one of said first horizontal axis and said second vertical axis and said third motor is adapted to cause pivoting of said at least two propellers about the other of said first horizontal axis and said second vertical axis.

19. The invention of claim 16 further comprising:
an elevator coupled to a tail end of said fuselage by means of a third connection, said third connection adapted to permit said elevator to be pivoted about a second horizontal axis parallel to said first horizontal axis.

20. The invention of claim 16, further comprising:
a controller located on board said fuselage and having a first output coupled to said first motor and a second output coupled to said second motor to control the operations thereof.

* * * * *